United States Patent [19]

Ichikawa

[11] Patent Number: 6,031,645
[45] Date of Patent: *Feb. 29, 2000

[54] BI-DIRECTIONAL OPTICAL COMMUNICATIONS SUBSCRIBER TRANSMISSION SYSTEM USING A SINGLE WAVELENGTH

[75] Inventor: Akihiko Ichikawa, Sapporo, Japan

[73] Assignee: Fujitsu LImited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,814

[22] Filed: Jul. 22, 1996

Related U.S. Application Data

[63] Continuation of application No. 08/555,138, Nov. 8, 1995, abandoned, which is a continuation of application No. 08/373,577, Jan. 17, 1995, abandoned.

[30] Foreign Application Priority Data

Jun. 29, 1994 [JP] Japan ..................................... 6-147621

[51] Int. Cl.[7] .............................. H04B 10/24; H04J 14/02
[52] U.S. Cl. .......................... 359/113; 359/125; 359/168; 359/121
[58] Field of Search .................................... 359/124–125, 359/118, 137, 143, 113–117, 121–123, 164–168; 348/6, 12–14; 370/30, 69.1, 71, 468, 485–487; 455/5.1, 102–105; 379/56.1–56.3

[56] References Cited

U.S. PATENT DOCUMENTS

| 4,685,099 | 8/1987 | White et al. ............................... 370/30 |
| 4,696,063 | 9/1987 | Schembri ................................. 359/125 |
| 4,748,689 | 5/1988 | Mohr ....................................... 359/118 |
| 5,136,411 | 8/1992 | Paik et al. ............................... 359/125 |
| 5,142,532 | 8/1992 | Adams ..................................... 455/5.1 |
| 5,245,459 | 9/1993 | Faulkner et al. ........................ 359/125 |
| 5,272,555 | 12/1993 | Suzuki .................................... 359/143 |
| 5,317,440 | 5/1994 | Hsu ......................................... 359/124 |
| 5,408,259 | 4/1995 | Warwick .................................... 348/6 |

FOREIGN PATENT DOCUMENTS

91/09478  6/1991  WIPO .

OTHER PUBLICATIONS

Patent Abstracts of Japan, of JP–A–61–30139, Feb. 12, 1996.
Patent Abstracts of Japan, of JP–A–1–198127, Aug. 9, 1989.
Fenning et al., "A 32 Channel Subcarrier Multiplexed Video Broadcast System Operating Over a High Loss Passive Optical Network," *ECOC '89*, Sep. 19, 1989, pp. 207–210.
Mudhar, "A Hybrid Approach to the Transmission of Telephony Over a Passive Optical Network," *International Journal of Digital and Analog Communication Systems*, vol. 5, No. 2, Apr. 1992, pp. 77–83.
Cooper et al., "CPTON—Cordless Telephony Services Over a Passive Optical Network Using Fibre Radio Techniques," *Supercomm/ICC '92*, Jun. 14, 1992, pp. 91–96.
Weyland, "Satelliten–Zwischenfrequenz glasklar übertragen," *Funkschau*, vol. 65, No. 5, Feb. 19, 1993, pp. 68–69 & 74–75.
Olshansky, "A Migrahon Path to BISDN", *IEEE LCS*, Aug. 1990, pp. 30–34.

*Primary Examiner*—Leo H. Boudreau
*Assistant Examiner*—Bhavesh Mehta
*Attorney, Agent, or Firm*—Staas & Halsey, LLP

[57] ABSTRACT

With regard to an optical communications system, in a system using a single optical fiber cable between subscribers and an exchange and in which bi-directional transmission is performed using the same 1.3-$\mu$m wavelength, the exchange-to-subscriber signal is a high-speed, wideband signal which is bandwidth limited by means of a lowpass filter, and the subscriber-to-exchange signal is a carrier having a frequency higher than the upper limit of the exchange-to-subscriber signal and which is modulated with a low-speed, narrowband signal.

17 Claims, 6 Drawing Sheets

BI-DIRECTIONAL OPTICAL COMMUNICATIONS SUBSCRIBER TRANSMISSION SYSTEM USING A SINGLE WAVELENGTH

This application is a continuation of application number Ser. No. 08/555,138 filed Nov. 8, 1995, now abandoned, which is a continuation of application Ser. No. 08/373,577, filed Jan. 17, 1995, now abandoned.

BACKGROUND OF THE INVENTION

1. Field of the Invention

The present invention relates to an optical communications system and, more specifically, to an optical communications system in which an exchange and a subscriber are linked via an optical fiber cable, a single wavelength of 1.3 $\mu$m being used for bi-directional communications and a wideband signal being transmitted to the subscriber.

2. Description of the Related Art

A known system for using an optical fiber cable to transmit a wideband signal to a subscriber is the WDM (wavelength division multiplexing) system, in which wavelength multiplexing is done of a 1.55-$\mu$m video frequency division multiplexed (FDM) signal and a 1.3-$\mu$m low-speed data bi-directional burst-multiplexed signal.

In the WDM system of the past, a multichannel video frequency division multiplexed (FDM) signal is converted at the exchange to a 1.55-$\mu$m optical signal using an electrical-optical converter, this optical signal passing through an optical mixer/divider and then being output to the optical transmission path. At the subscriber side, the 1.55-$\mu$m optical signal from the optical transmission path is separated using an optical mixer/divider, after which it is restored to a video signal by means of an optical-electrical converter.

Low-speed signals, such as voice or low-speed data, are used for bi-directional communications between the exchange and the subscriber; in these communications, systems such as TCM (time compression multiplexing), which performs time switching between transmission and reception, are used. Specifically, during the period of transmission from the exchange, the low-speed signal is converted to a 1.3-$\mu$m optical signal using an electrical-optical converter, this signal passing through an optical coupler and then through an optical mixer/divider, at which it is wavelength multiplexed with the above-noted 1.55-$\mu$m video optical signal (thereby becoming a 1.3 $\mu$m+1.55 $\mu$m signal), this signal then being output to the optical fiber transmission path. At the subscriber side, this multiplexed signal is separated into the 1.3-$\mu$m and the 1.55-$\mu$m optical signals using an optical mixer/divider, the above-noted 1.3-$\mu$m optical signal being restored to a low-speed signal by means of an optical-electrical converter.

On the reverse side, during the receiving period of the exchange, that is, during the period in which the subscriber is transmitting, the low-speed signal at the subscriber side is converted to a 1.3-$\mu$m optical signal, using an electrical-optical converter, this optical signal passing through an optical coupler and being fed to an optical mixer/divider, the multiplexed signal output of which (1.3 $\mu$m+1.55 $\mu$m) being output to a single optical fiber transmission path. At the exchange, the above-noted multiplexed signal is separated into a 1.3-$\mu$m optical signal and a 1.55-$\mu$m optical signal using an optical mixer/divider, the 1.3-$\mu$m optical signal being fed via an optical coupler to an optical-electrical converter, which restores it to the original low-speed signal.

In this manner, with regard to the low-speed signal, bi-directional communications are performed by alternately switching between transmission and reception between the exchange and the subscriber. By using optical mixer/dividers, the low-speed signal is either mixed with or separated from the high-speed signal, such as the above-noted video signal, thereby to enable signal transmission without mutual interference between the two signals.

However, in the above-described system, in order to perform wavelength division multiplexing of the video signal and a low-speed signal, it is necessary to have two types of optical components, those for 1.55 $\mu$m and those for 1.3 $\mu$m, and it is further necessary to have optical mixer/dividers for the purpose of mixing and separating these signals. In addition, it is necessary to have a circuit device for the purpose of time division multiplexing of transmission, and of reception, of the low-speed signal, these hardware requirements making this past system costly and complex.

In addition, with regard to the subscriber signal, while there is a desire to have wideband signals such as video signals sent from the exchange to the subscriber, in the reverse direction, the signal from the subscriber to the exchange is a low-speed, narrowband signal, such as request signals and telephone signals; thus it is necessary to consider the extremely asymmetrical nature, in terms of the signal transmission directions, of such prior art systems.

SUMMARY OF THE INVENTION

In consideration of the above-described problems, an object of the present invention is to achieve bi-directional communications using a single wavelength, thereby achieving a system that is simple and low cost.

Another object of the present invention is, by means of appropriating assignment bandwidths respectively to the path from the exchange to the subscriber, and to the path from the subscriber to the exchange, to actually take advantage of the above-noted asymmetry of the transmission directions, to achieve efficient bi-directional signal transmission.

Yet another object of the present invention is to achieve a further reduction of cost and complexity of the system, by, for example, making use of signals used in current systems respectively for the subscriber-to-exchange signal (used synonymously herein and in the claims with the expression "upward signal"); and the exchange-to-subscriber signal (used synonymously hereinafter and in the claims with the expression "downward signal"), thereby enabling sharing of hardware with current systems.

According to the present invention, an optical communications system performing single-wavelength bi-directional communications is provided, in which the exchange and a subscriber are linked by a single optical fiber cable, and a high-speed, wideband signal, the bandwidth of which is limited by a lowpass filter, is used as the exchange-to-subscriber signal. For the subscriber-to-exchange signal, a carrier of a frequency higher than the upper limit of the above-noted exchange-to-subscriber signal is modulated by the low-speed, narrowband signal.

As the above-noted exchange-to-subscriber signal, an ITU standard STM-1 (155.52 MB/s) or STM-4 (622.08 Mb/s) signal is used and, as the carrier of the subscriber-to-exchange signal, the 800-MHz mobile telephone band, the 1.5-GHz band or the Personal Handy Phone 1.9-GHz band is used.

In addition, as the exchange-to-subscriber signal, an FDM signal of a number of carriers modulated with a video signal and a number of carriers modulated by low-speed signals assigned to individual subscribers are used and, as the subscriber-to-exchange signal, the 800-MHz mobile telephone band, the 1.5-GHz band, or the Personal Handy Phone 1.9-GHz band is used.

According to the present invention, a bi-directional optical communications subscriber transmission system using a single wavelength is provided, in which with respect to a passive double star (PDS) system using optical splitters to link the exchange and subscribers, and also with respect to a single star (SS) system using one-to-one links between the exchange and subscribers, the first BS (broadcast satellite) intermediate frequency of 1.3 GHz is used as the exchange-to-subscriber carrier, and the Personal Handy Phone 1.9-GHz band is used as the subscriber-to-exchange carrier, the subscriber-to-exchange signal being used for channel selection of the exchange-to-subscriber video signal.

According to the present invention it is desirable to prevent crosstalk between the exchange-to-subscriber signal and the subscriber-to-exchange signal, which signals use one and the same wavelength to perform bi-directional communications between the exchange and a subscriber. In the present invention, this is taken into consideration, a high-speed, wideband signal which is bandwidth-limited by means of a lowpass filter being used as the exchange-to-suscriber signal, and a signal consisting of a carrier of a frequency higher than the upper limit of the bandwidth of the exchange-to-subscriber signal, modulated by a low-speed, narrowband signal being used for the subscriber-to-exchange signal.

According to this system, because the bands used by the exchange-to-subscriber signal and the subscriber-to-exchange signal are separated from one another, the above-noted crosstalk problem is solved. Further, by assigning a high-speed, wideband signal to the exchange-to-subscriber signal and a low-speed, narrowband signal to the subscriber-to-exchange signal, the actual needs of the subscriber side are satisfied. By doing this, it is possible to assign subscriber-to-exchange signal carrier frequencies to each user in the case of the passive double star (PDS) system, as well, this system being one in which optical splitters are used to link an exchange with a number of subscribers.

In addition, according to this system, it is possible to use, as is, the signals employed in existing communications systems, such as mobile telephone and CATV systems, thereby enabling utilization of communications equipment and transmitters and receivers for those systems with the system of the present invention. By doing this, the system of the present invention is not only simplified, but also provides a reduction in cost.

BRIEF DESCRIPTION OF THE DRAWINGS

The present invention will be more clearly understood from the descriptions as set forth below, with reference to the following accompanying drawings.

DESCRIPTION OF THE PREFERRED EMBODIMENTS

Figure 1:
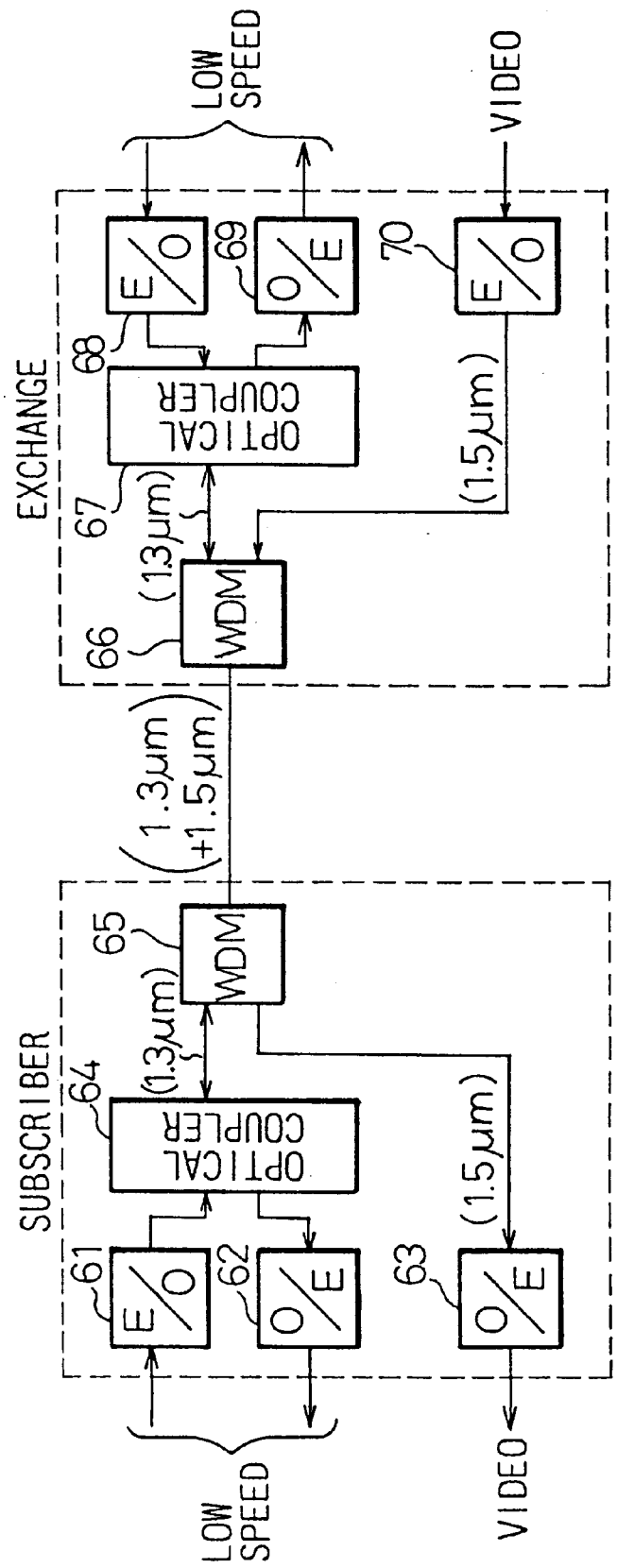
FIG. 1 is a block diagram of the configuration of the general configuration of a WDM system in the prior art.

Before describing the preferred embodiments according to the present invention, examples of the related art are provided, with reference made to FIG. 1.

FIG. 1 shows a block diagram of the general configuration of the WDM system in the prior art.

In FIG. 1, at the exchange side a frequency division multiplexed (FDM) multichannel video signal is converted by means of an electrical-optical converter (E/O) 70 to a 1.55-μm optical signal, this optical signal passing through an optical mixer/divider (WDM) 66, after which it is output to the optical fiber transmission path. At the subscriber side, the above-noted 1.55-μm optical signal from the optical fiber transmission path is separated by an optical mixer/divider (WDM) 65, this being converted to the original video signal by means of the optical-electrical converter (O/E) 63.

The low-speed voice or low-speed data signal is used in bi-directional communications between the exchange and the subscriber, TCM (time compression multiplexing) being used to perform time switching between transmission and reception. That is, during the period of transmission from the exchange, the low-speed signal is converted to a 1.3-μm optical signal by means of an electrical-optical converter 68, this optical signal being passed through the optical coupler 67, and then being wavelength multiplexed with the above-noted 1.55-μm video signal at the optical mixer/divider 66, the resulting (1.3 μm+1.55 μm) signal being output to the optical fiber transmission path. At the subscriber side, the multiplexed signal is separated by means of the optical mixer/divider 65 into the 1.3-μm optical signal and the 1.55-μm optical signal, the 1.3-μm optical signal being restored to the original low-speed signal by means of the optical-electrical converter 62.

In the reverse direction, in the period during which the exchange is receiving, that is, the period during which the subscriber is transmitting, at the subscriber the low-speed signal from the subscriber is converted to a 1.3-μm optical signal by means of the electrical-optical converter 61, this signal passing though the optical coupler 64 and being fed to the optical mixer/divider 65, at which it is wavelength division multiplexed, resulting in an (1.3 μm+1.55 μm) optical signal which is output to the single optical fiber transmission path. At the exchange, this multiplexed signal is separated by means of the optical mixer/divider 66 into the 1.3-μm and 1.5-μm optical signals, the 1.3-μm optical signal being restored to the original low-speed signal by means of the optical-electrical converter 69.

In this manner, bi-directional communications between the exchange and the subscriber with respect to the low-speed signal are performed by performing time switching between transmission and reception. By using optical mixer/dividers this low-speed signal is either mixed with or separated from the high-speed signal such as the above-noted video signal, to enable signal transmission without mutual interference between the two signals.

However, in the above-described system, in order to perform wavelength division multiplexing of the video signal and a low-speed signal, it is necessary to have two types of optical components, those for 1.55 μm and those for 1.3 μm, and it is further necessary to have optical mixer/dividers for the purpose of mixing and separating these signals. In addition, it is necessary to have a circuit device for the purpose of time division multiplexing of transmission and reception of the low-speed signal, these hardware requirements making this prior art system costly and complex.

In addition, with regard to the subscriber signal, while there is a desire to have wideband signals such as video signals sent from the exchange to the subscriber, in the reverse direction, the signal from the subscriber to the exchange is a low-speed, narrowband signal, such as request signals and telephone signals, and it is necessary to consider the extremely asymmetrical nature of this system, in terms of signal transmission direction.

Figure 2:
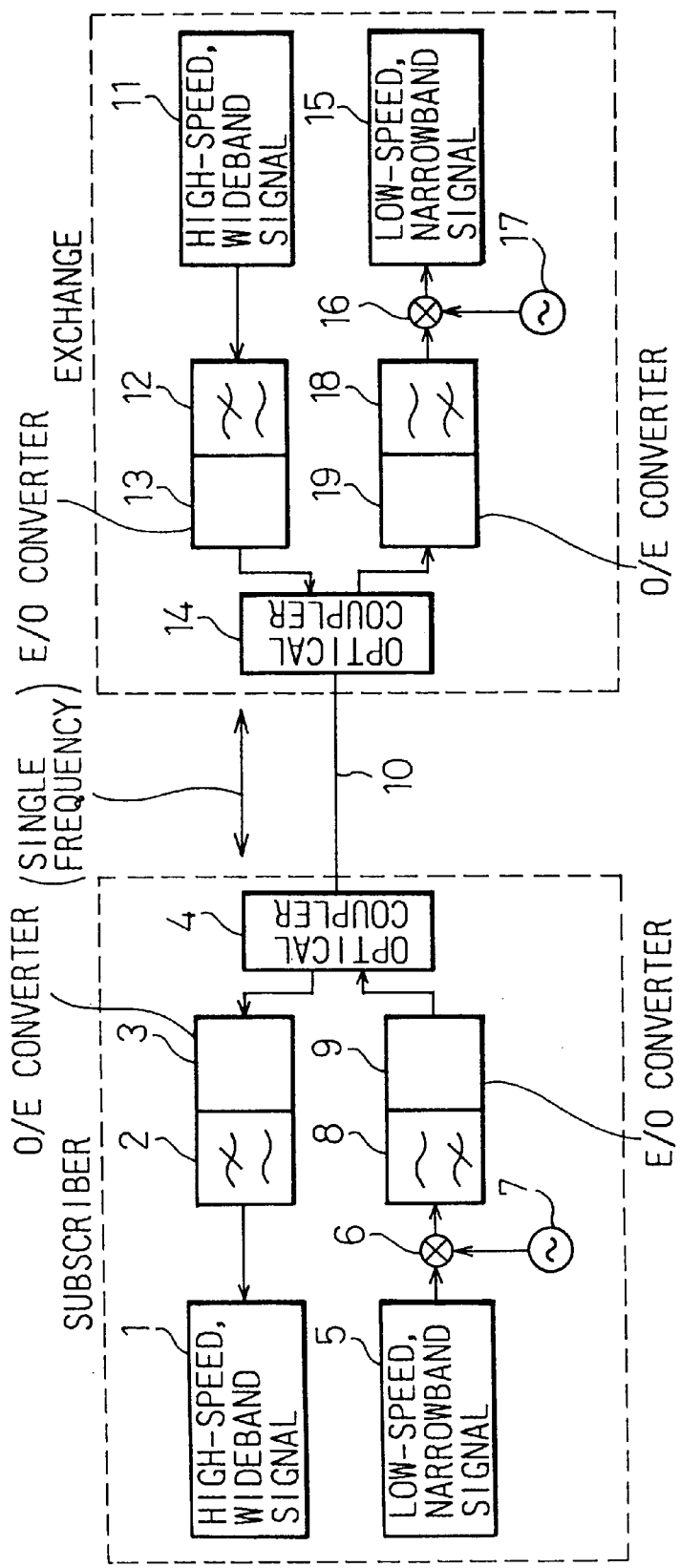
FIG. 2 is a block diagram which shows the basic configuration of a bi-directional optical communications subscriber transmission system using a single wavelength according to the present invention.

FIG. 2 shows the basic configuration of a bi-directional optical communications subscriber transmission system using a single wavelength according to the present invention.

In FIG. 2, at the exchange a high-speed, wideband signal such as a video signal is bandwidth limited by means of the lowpass filter 12, and then converted to an optical signal of, for example, 1.3 μm by a electrical-optical converter 13. The resulting optical signal output passes through the optical coupler 14 and is transmitted via a single optical fiber transmission path 10.

At the subscriber side, the optical signal from the exchange which is received via the transmission path 10 and passes through optical coupler 4 is fed to opticalelectrical converter 3, at which it is converted to an electrical signal. This electrical signal is also passed through the lowpass filter 2 for the purpose of eliminating the subscriber-to-exchange signal component on the transmission path 10 which modulates the high-frequency carrier with a low-speed, narrowband signal, thereby restoring this signal to the original high-speed, wideband signal 1.

With regard to the subscriber-to-exchange signal, at the subscriber side a carrier output 7, having a frequency higher than the above-noted high-speed, wideband signal is modulated by a low-speed, narrowband signal 5 such as a voice or low-speed data signal by means of mixer 6. This modulated output is then passed through the highpass filter 8 to separate it distinctly from the above-noted high-speed, wideband signal, after which it is converted to a 1.3-82 m optical signal, having the same wavelength as the above-described exchange-to-subscriber signal, by the electrical-optical converter 9. This optical output signal is then passed through the optical coupler 4 and transmitted over the same optical fiber transmission path 10 as the exchange-to-subscriber signal.

At the exchange side, the optical signal transmitted to the exchange via the transmission path 10 is passed through the optical coupler 14, after which it is fed to the optical-electrical converter 19, which converts this optical signal to an electrical signal. In order to eliminate the above-noted high-speed, wideband signal component from this electrical signal, the signal is passed through the highpass filter 18, after which it is mixed at mixer 16 with the carrier output 17 the same as the carrier output 7 at the subscriber side, thereby restoring the signal to the original low-speed, narrowband signal 15.

Figure 3:
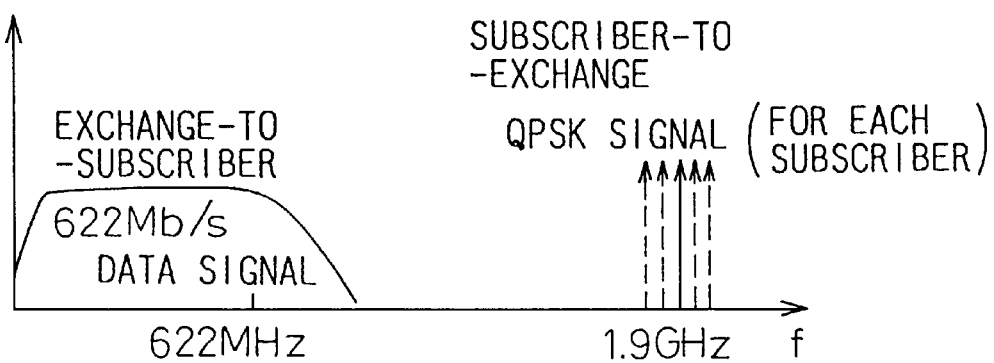
FIG. 3 is a drawing which shows an example of the frequency positions of the exchange-to-subscriber and subscriber-to-exchange signals for the system shown in FIG. 2.

FIG. 3 shows an example of the frequency positions for the exchange-to-subscriber and subscriber-to-exchange signals for the system shown in FIG. 2.

In FIG. 3, an ITU standard STM-4 (622.08 Mb/s) high-speed data signal, passed through a lowpass filter for bandwidth limiting, is shown as the exchange-to-subscriber signal. As the subscriber-to-exchange signal, a low-speed, narrowband signal such as a high-frequency (1.9-GHz Personal Handy Phone band) carrier QPSK modulated with a low-speed data signal is shown.

It is also possible to use an ITU standard STM-1 (155.52 Mb/s) signal or a signal in the 800-MHz or 1.5-GHz digital mobile telephone band as the exchange-to-subscriber signal.

Figure 4:
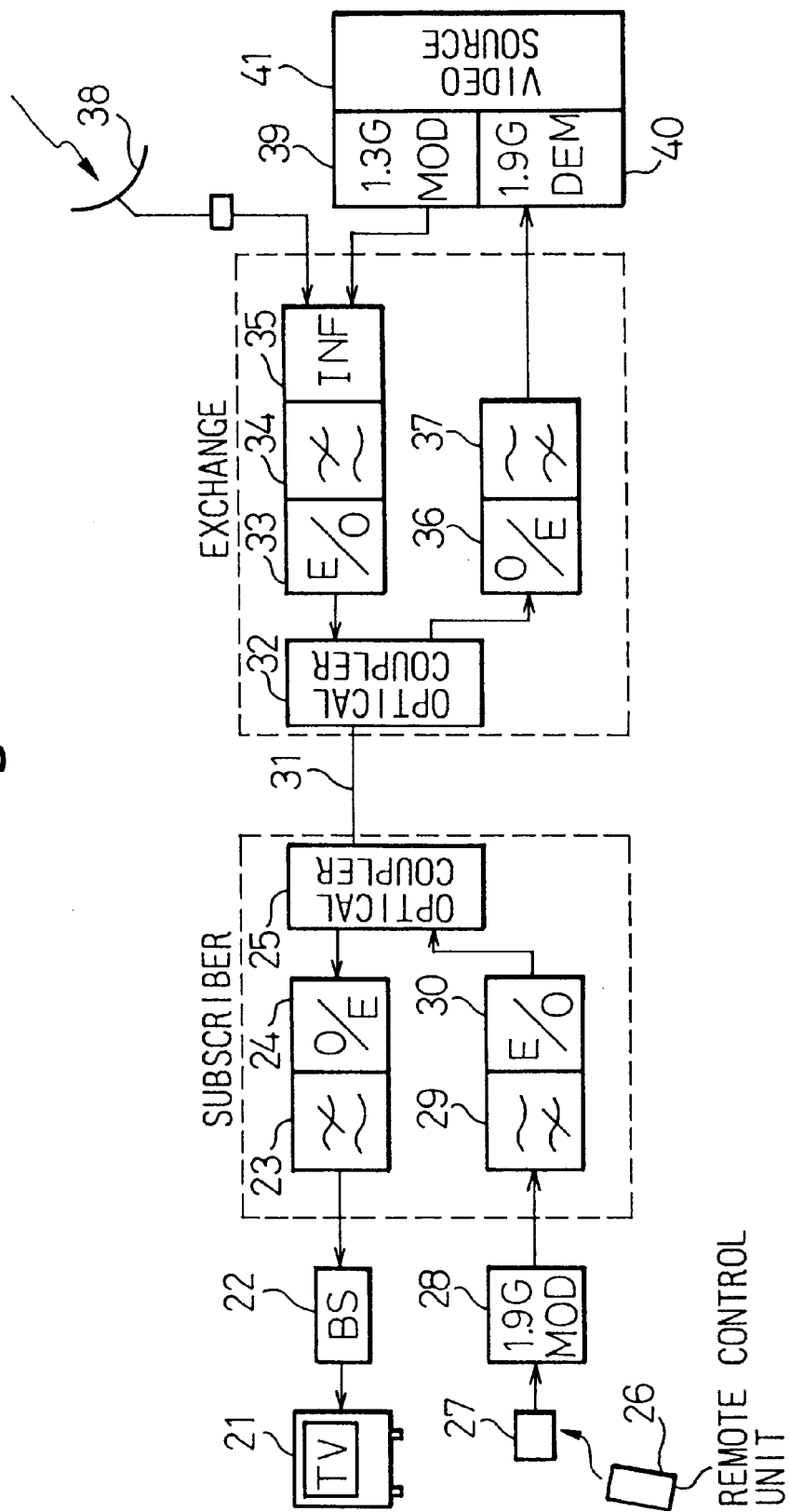
FIG. 4 shows an embodiment of a bi-directional optical communications subscriber transmission system using a single wavelength according to the present invention.

FIG. 4 shows an embodiment of a bi-directional optical communications subscriber transmission system using a single wavelength according to the present invention. This embodiment shows the example of a single-star (SS) system, in which there is a one-to-one link between subscribers and the exchange.

In FIG. 4, a 1.3-GHz band BS (broadcast satellite) video signal is used as is as the high-speed, wideband exchange-to-subscriber signal. That is, the video signal received by the antenna 38, after receive level, etc., adjustments at the receiving interface (INF) 35, is processed in exactly the same manner as shown in FIG. 2, this signal being output to the subscriber as the high-speed, wideband signal. Because this output signal is the video signal received by the antenna, it can be directly input to a commercially available BS tuner 22, and displayed on the screen of a television receiver 21.

At the exchange side, separate from the above-noted video signal received from the satellite, a dedicated video source 41 is provided, a 1.3 G modulator (1.3 GMOD) 39 being used to convert the video signal from the video source 41 to the same 1.3-GHz band video signal as the broadcast satellite, this signal being inserted into channels which are not occupied in the broadcast satellite signal.

In the embodiment shown in FIG. 4, the low-speed, narrowband subscriber-to-exchange signal is used for selection of the video signal or selection of the video channel from the above-noted video source. That is, an operation performed by the remote control unit 26 is received by the receiver 27, this being converted to a frequency in the 1.9-GHz band by the 1.9 G modulator (1.9 GMOD) 28 installed at the subscriber side. The modulation of a 1.9-GHz carrier and subsequent processing are the same as described with regard to FIG. 2. At the exchange, a 1.9 G demodulator (1.9 GDEM) 40 performs demodulation to restore the original selection signal (low-speed, narrowband signal). The above-noted selection signal is applied to the video source 41, which outputs the selected video signal. The 1.9-GHz modulator 28 installed at the subscriber side can be the same as that used in a Personal Handy Phone.

Figure 5:
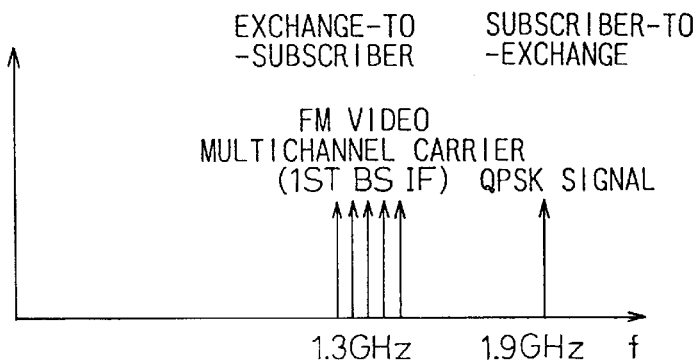
FIG. 5 is a drawing which shows an example of the frequency positions in the embodiment shown in FIG. 4.

FIG. 5 shows an example of the frequency positions in the embodiment shown in FIG. 4.

In FIG. 5, the example shown is that of a single or multiple FM modulated carriers in the 1.3-GHz band, which is the first broadcast satellite intermediate frequency used as the exchange-to-subscriber signal, and a 1.9-GHz Personal Handy Phone band carrier QPSK modulated with a low-speed data signal used as the subscriber-to-exchange signal. In the above-described embodiment, it is possible to select the exchange-to-subscriber video signal or video signal channel by means of the subscriber-to-exchange signal.

Figure 6:
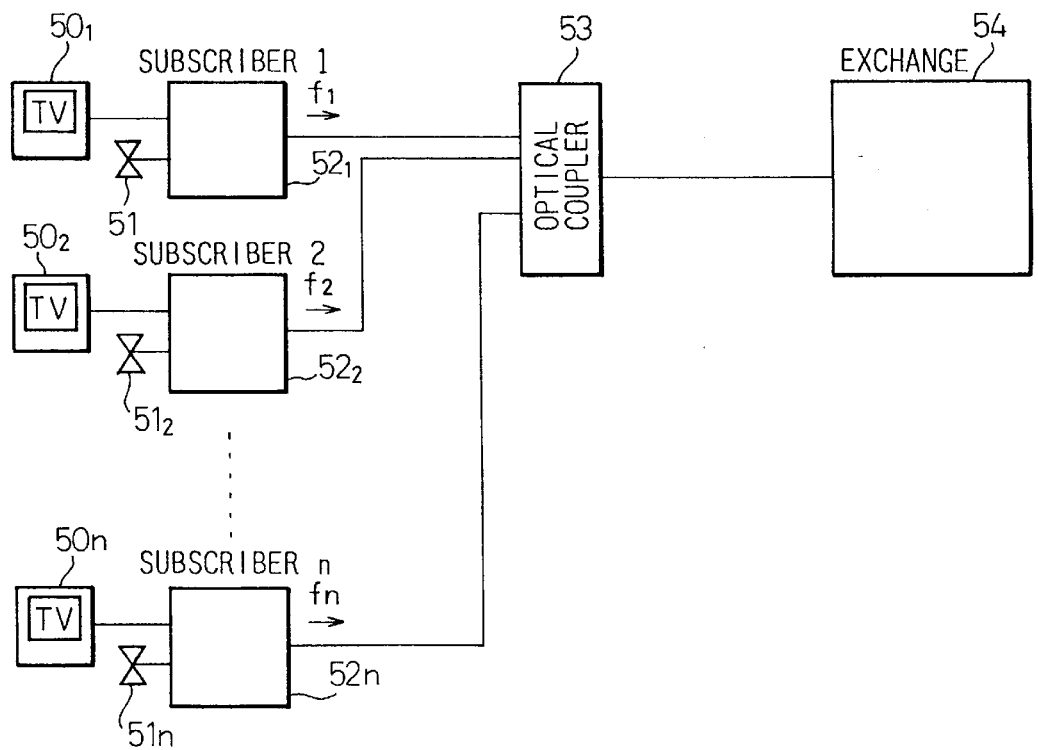
FIG. 6 shows an embodiment of the present invention as applied to a passive double star (PDS) system.

FIG. 6 shows an embodiment of the present invention as applied to a passive double star (PDS) system.

In FIG. 6, in the PDS system, a single optical fiber cable transmission path connected to the exchange 54 is connected via optical coupler 53 to a number of subscribers 1 to n. With regard to the exchange-to-subscriber signals from exchange 54, video signals receivable on the television receivers $50_1$ to $50_n$ of each of the subscribers and voiceband frequencies corresponding to telephones $51_1$ to $51_n$ of each of the subscribers are assigned. In the reverse direction, carrier frequencies (f1 to fn) are assigned for sending a signal to the exchange at the time of subscription.

A more detailed block configuration would include elements that are the same as shown in FIG. 2 and FIG. 4, and is therefore not presented herein. In the case of this embodiment, in addition to the video signals, it is possible to use the telephones of each of the subscribers via cables.

Figure 7:
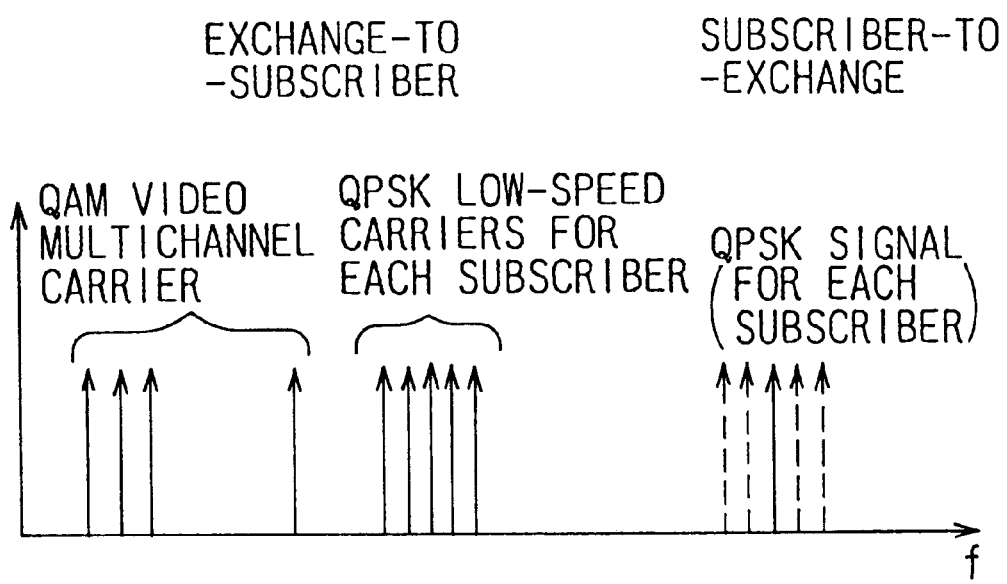
FIG. 7 is a drawing which shows an example of the frequency positions in the embodiment shown in FIG. 6.

FIG. 7 shows an example of frequency positions for the above-noted embodiment.

In FIG. 7, the example shown is that of an exchange-to-subscriber signal consisting of a number of carriers modulated, for example, by FM or QAM video signals, and a FDM signal consisting of a number of carriers assigned to each subscriber and modulated with low-speed signals by, for example, QPSK. The upper limit of the carrier frequencies is lower than the subscriber-to-exchange signal frequency.

Additionally, in this example, the subscriber-to-exchange signals are carriers in the 800-MHz or 1.5-GHz digital mobile telephone band or 1.9-GHz Personal Handy Phone band, modulated with a low-speed data signal by, for example, QPSK.

As described above, according to the present invention, it is possible to achieve bi-directional communications using a single wavelength, which results in a simplification of the system and a reduction in cost.

Additionally, by judiciously assigning frequency bands individually to the exchange-to-subscriber signals and the subscriber-to-exchange signals, the present invention takes advantage of the transmission direction asymmetry of the above signals, thereby achieving highly efficient bi-directional signal transmission.

Furthermore, by using the signals being used in current communications systems as the exchange-to-subscriber and subscriber-to-exchange signals, the present invention enables hardware sharing with those system, thereby providing a simplification and cost reduction in configuring a system.

What is claimed is:

1. A bi-directional optical subscriber communications system, comprising:
    a base-band modulator modulating an optical single wavelength signal by one or more exchange-to-subscriber signals to produce and output a high-speed and wide-band downward signal as a lower-band signal;
    a first modulator modulating from the optical single wavelength signal to one or more carrier signals having respective frequencies higher than an upper limit of frequencies of the exchange-to-subscriber signals, and a second modulator modulating the carrier signals by the corresponding one or more subscriber-to-exchange signals to produce and output a low-speed and narrow-band upward signal as a higher-band signal; and
    a low-pass filter separating the high-speed and wide-band downward signal, as a lower-band signal, from the low-speed and narrow-band upward signal, as a higher-band signal.

2. The bi-directional optical communications system according to claim 1, wherein in a passive double star system, in which optical splitters are used to link subscribers to an exchange, upward signal carrier frequencies are assigned to each of the subscribers.

3. The bi-directional optical communications system according to claim 1, wherein each said downward signal comprises one of an FDM signal comprising a plurality of carriers modulated with ITU standard STM-1, STM-4, and video signals and a plurality of carriers assigned to individual subscribers and modulated with low-speed signals.

4. The bi-directional optical communications system according to claim 1, wherein the carrier of said upward signal is in a selected one of the 800-MHz band, the 1.5-GHz digital mobile telephone band and the 1.9-GHz Personal Handy Phone band.

5. The bi-directional optical communications system according to claim 1, wherein one of an ITU standard STM-1 signal (155.52 Mb/s) and an ITU standard STM-4 signal (622.08 Mb/s) is used as said downward signal, and wherein the carrier of said upward signal is in a selected one of the 800-MHz band, the 1.5-GHz digital mobile telephone band and the 1.9-GHz Personal Handy Phone band.

6. The bi-directional optical communications system according to claim 1, wherein:
    said downward signal is an FDM signal comprising a plurality of carriers modulated with video signals and a plurality of carriers assigned to each said subscriber and modulated with low-speed signals; and
    the carrier of said upward signal is in a selected one of the 800-MHz band, the 1.5-GHz digital mobile telephone band and the 1.9-GHz Personal Handy Phone band.

7. The bi-directional optical communications system according to claim 1, wherein:
    a one-to-one link exists between subscribers and an exchange; and
    the 1.3-GHz band, comprising the first broadcast satellite intermediate frequency, is used for the carrier of said downward signal, the 1.9-GHz Personal Handy Phone band is used for the carrier of the upward signal and, further, selection of the downward video signal channel is performed by said upward signal.

8. A bi-directional optical communication system communicating between a subscriber station and an exchange over an optical fiber cable extending therebetween and using a single communication wavelength, comprising:
    in the subscriber station, a low pass filter separating a downward signal, transmitted by the exchange over the optical fiber cable to the subscriber station, from an upward signal, transmitted by the subscriber station over the optical fiber cable to the exchange; and
    in the exchange, a low pass filter bandwidth limiting a high-speed, wideband signal for conversion to an optical signal for coupling to and transmission over the single optical fiber cable to the subscriber station.

9. The system as recited in claim 8, wherein:
    the subscriber station further comprises:
        a source of a carrier signal having a frequency higher than the frequency of the high-speed wideband signal, and
        a source of a low-speed, narrowband signal,
        a mixer modulating the low-speed narrowband signal on the carrier signal and producing a modulated signal as an output, and
        a high pass filter separating the modulated signal from the high-speed wideband signal and outputting same as an upward signal for transmission, as an optical output signal, over the optical fiber cable to the exchange; and
    the exchange further comprises a high pass filter, coupled to the optical fiber cable, receiving an electrical signal converted from the received upward signal and separating the modulated signal from the high-speed wideband signal component of the downward signal.

10. A bi-directional optical communication method of transmitting and receiving first and second optical signals, having a common wavelength, over a common optical transmission line, comprising:

dividing a frequency bandwidth of a modulation signal for an optical signal into higher and lower frequency regions, modulating the first optical signal with a first modulation signal having a frequency selected from the higher frequency region and modulated with first information, and modulating the second optical signal with a second modulation signal having a frequency selected from the lower frequency region and including second information having a broader bandwidth than the first information.

11. A communications station connected to a central station via an optical transmission line, the communications station comprising:

an optical transmitter transmitting, over the optical transmission line to the control station, a first optical signal which is modulated by a first modulation signal having a first frequency modulated with first information of a first bandwidth; and an optical receiver receiving, from the optical transmission line, a second optical signal which is modulated by a second modulation signal having a second frequency less than the first frequency and including second information having a second bandwidth broader than the first bandwidth.

12. A central station connected to a communications station via an optical transmission line, the central station comprising:

an optical receiver receiving, from the optical transmission line, a first optical signal which is modulated with a first modulation signal of a first frequency and modulated with first information of a first bandwidth; and an optical transmitter transmitting, over the optical transmission line, a second optical signal which is modulated with a second modulation signal of a second frequency and including second information of a second bandwidth broader than the first bandwidth.

13. A bi-directional optical communication system, comprising:

first and second communications stations;

the first communications station further comprising:
an optical transmitter transmitting, over the optical transmission line to the second communications station, a first optical signal which is modulated by a first modulation signal having a first frequency and modulated with first information of a first bandwidth, and an optical receiver receiving, over the optical transmission line from the second communications station, a second optical signal; and the second communications station further comprising:
an optical receiver receiving, from the optical transmission line, the first optical signal, and an optical transmitter transmitting, over the optical transmission line to the second communications station, the second optical signal modulated with a second modulation signal of a second frequency and including second information of a second bandwidth broader than the first bandwidth.

14. The bi-directional optical communication system as recited in claim 13, wherein the first communications station is a subscriber station and the second communications station is an exchange station.

15. A bi-directional optical communication system for transmitting and receiving first and second optical signals, having a common wavelength, between two stations interconnected through an optical transmission line, wherein:

a frequency bandwidth of a modulation signal for an optical signal is divided into higher and lower frequency regions, the first optical signal is modulated with a first modulation signal having a first frequency selected from the higher frequency region, modulated with first information, and the second optical signal is modulated with a second frequency signal having a second frequency selected from the lower frequency region and including second information of a broader bandwidth than the first information.

16. A method of bi-directional optical subscriber communication, comprising:

base-band modulating an optical single wavelength signal by one or more exchange-to-subscriber signals to produce a high-speed and wide-band downward signal, as a lower-band signal;

modulating from the optical single wavelength signal to one or more carrier signals having frequencies higher than the upper limit of the exchange-to-subscriber signals, and modulating the carrier signals by the corresponding one or more subscriber-to-exchange signals to produce a low-speed and narrow-band upward signal, as a higher-band signal; and separating the high-speed and wide-band downward signal as a lower-band signal from the low-speed and narrow-band upward signal as a higher-band signal using a low-pass filter.

17. A bi-directional optical subscriber communications system, comprising:

a high-speed and wide-band downward signal as a lower-band signal, which is provided by base-band modulating an optical single wavelength signal by one or more exchange-to-subscriber signals;

a low-speed and narrow-band upward signal as a high-band signal, which is provided by modulating the optical signal wavelength signal to one or more carrier signals having each frequency higher than an upper limit of the exchange-to-subscriber signals, and modulating the carrier signals by corresponding one or more subscriber-to-exchange signals; and a low-pass filter separating the high-speed and wide-band downstream signal as a lower-band signal from the low-speed and narrow-band upward signal as a higher-band signal.

* * * * *

UNITED STATES PATENT AND TRADEMARK OFFICE
CERTIFICATE OF CORRECTION

PATENT NO. : 6,031,645
DATED : February 29, 2000
INVENTOR(S) : Akihiko ICHIKAWA

It is certified that error appears in the above-identified patent and that said Letters Patent is hereby corrected as shown below:

On the title page, [73] Assignee, change "LImited" to --Limited--.

On the title page, [56] References Cited, Other Publications, line 2, change "1996" to --1986--;
       line 17, change "Migrahon" to --Migration--.

Signed and Sealed this

Ninth Day of January, 2001

Attest:

Q. TODD DICKINSON

*Attesting Officer*      *Commissioner of Patents and Trademarks*